United States Patent
Kim (10) Patent No.: US 12,515,732 B2
(45) Date of Patent: Jan. 6, 2026

(54) ELECTRONIC STEERING APPARATUS FOR VEHICLE AND METHOD OF CONTROLLING SAME

(71) Applicant: HYUNDAI MOBIS CO., LTD., Seoul (KR)

(72) Inventor: Dong Hee Kim, Yongin-si (KR)

(73) Assignee: Hyundai Mobis Co., Ltd., Seoul (KR)

(*) Notice: Subject to any disclaimer, the term of this patent is extended or adjusted under 35 U.S.C. 154(b) by 189 days.

(21) Appl. No.: 18/185,070

(22) Filed: Mar. 16, 2023

(65) Prior Publication Data

US 2024/0227925 A1 Jul. 11, 2024

(30) Foreign Application Priority Data

Jan. 9, 2023 (KR) .................. 10-2023-0002793

(51) Int. Cl.
*B62D 5/04* (2006.01)
*B60W 50/16* (2020.01)

(52) U.S. Cl.
CPC .......... *B62D 5/0487* (2013.01); *B60W 50/16* (2013.01); *B62D 5/046* (2013.01)

(58) Field of Classification Search
CPC .... B62D 5/0487; B62D 5/046; B62D 5/0481; B62D 5/003; B62D 5/0484; B60W 50/16; B60R 16/033; B60Y 2306/13; B60Y 2306/15

See application file for complete search history.

(56) References Cited

U.S. PATENT DOCUMENTS

| 2002/0084757 A1 | 7/2002 | Ewbank et al. |
| 2002/0177932 A1* | 11/2002 | Kifuku ................. B62D 5/0481 |
| | | 180/443 |
| 2011/0035108 A1* | 2/2011 | Yamashita ........... B62D 5/0481 |
| | | 701/41 |

(Continued)

FOREIGN PATENT DOCUMENTS

| JP | 2004-276833 A | 10/2004 |
| KR | 10-2018-0007393 A | 1/2018 |

OTHER PUBLICATIONS

German Office Action issued on Sep. 4, 2023, in counterpart German Patent Application No. 10 2023 201 966.3 (6 pages in German).

*Primary Examiner* — Dylan M Katz
(74) *Attorney, Agent, or Firm* — NSIP Law (57) ABSTRACT

Disclosed herein is an electronic steering apparatus for a vehicle. The apparatus includes a first driver and a second driver configured to drive a drive motor by being supplied, respectively, with electric power from a first electric-power source and a second electric-power source, a first sensor and a second sensor configured to recognize states, respectively, of the first electric-power source and the second electric-power source, and states, respectively, of the first driver and second driver, a first output controller and a second output controller coupled to a vehicle control device, and a first processor and a second processor operatively coupled, respectively, to the first and second drivers, the first and second sensors, and the first output and second output controllers. The processors are configured to determine whether electric-power states of the first electric-power source and the second electric-power source are normal, by comparing the electric-power states with each other.

13 Claims, 4 Drawing Sheets

(56) References Cited

U.S. PATENT DOCUMENTS

2012/0253604 A1\* 10/2012 Doray .................. B62D 7/1581
  701/43
2017/0272009 A1   9/2017 Kawamura et al.
2018/0015945 A1   1/2018 Kim
2024/0132147 A1\* 4/2024 Kajisawa ............... B62D 5/046

\* cited by examiner

ELECTRONIC STEERING APPARATUS FOR VEHICLE AND METHOD OF CONTROLLING SAME

CROSS-REFERENCE TO RELATED APPLICATION

This application claims the benefit under 35 USC § 119(a) of Korean Patent Application No. 10-2023-0002793, filed on Jan. 9, 2023, in the Korean Intellectual Property Office, the entire disclosure of which is incorporated herein by reference for all purposes.

BACKGROUND

1. Field

The present disclosure relates to an electronic steering apparatus for a vehicle and a method of controlling the electronic steering apparatus for a vehicle and, more particularly, to an electronic steering apparatus for a vehicle, the apparatus being capable of performing fail driving by diagnosing a failure in a common part, when driven by being supplied with separated electric power from one battery pack in an electric vehicle equipped with a steer-by-wire (SBW) system, and a method of controlling the electronic steering apparatus for a vehicle.

2. Description of Related Art

Usually, for a steering apparatus for a vehicle, power steering systems have been developed and used in order to assist a driver in operating a steering wheel and to provide the convenience of the driver in driving the vehicle. The power steering systems developed and used are categorized into a hydraulic steering system that uses hydraulic pressure, a motor-driven hydraulic steering system that uses the hydraulic pressure and an electromotive force of a motor at the same time, a motor-driven steering system that uses only the electromotive force of the motor, and the like.

In recent years, steer-by-wire (SBW) systems have been developed and used. In the SBW systems, a steering column, or a mechanical connection apparatus, such as a universal joint and pinion shaft, between a steering wheel and a vehicle wheel is removed, and vehicle steering is performed by controlling driving of a motor connected to a rack bar using an electrical signal.

The SBW system may be configured to include a steering wheel that is turned by a driver for a steering operation, a reaction motor that is installed on one side of the steering wheel and provides reaction torque according to rotation of the steering wheel, a steering motor that is connected to a rack bar and performs the steering operation, sensors that measure a steering angle, a vehicle speed, and torque of the steering wheel, respectively, and an ECU that drives the steering motor and the reaction motor according to electrical signals that are input from the sensors.

The SBW system has no mechanical connection structure. Thus, injury to a driver that is caused by a mechanism when a vehicle collision occurs can be reduced. Moreover, the number of components for mechanical connection can be reduced. Accordingly, the weight of the vehicle can be reduced, and unnecessary consumption of energy when performing a steering operation can be reduced. The SBW system has the advantage of possibly achieving ideal steering performance by performing ECU programming. For this reason, there is a trend to the gradually increasing use of the SBW system.

The mechanical connection structure that is employed by an existing steering system employ is removed from the SBW system. Thus, the SBW system has the advantages, such as an increase in the degree of freedom in layout for a configuration of a steering system, an improvement in fuel efficiency, and removal of disturbance input in the reverse direction from a vehicle wheel. However, when a failure occurs in an electrical and electronic component inside the SBW system because switching to a safe state takes place and driving of an electrical and electronic system is interrupted, it is impossible to perform steering only with a hardware (H/W) component.

Therefore, all constituent elements of the SBW system, such as sensors and motors, are redundantly designed. Redundant systems must be independently supplied with electric power from separated electric power systems, respectively, of the vehicle.

SUMMARY

In one general aspect, an electronic steering apparatus for a vehicle is provided. The apparatus includes a first driver and a second driver configured to drive a drive motor by being supplied, respectively, with electric power from a first electric-power source and a second electric-power source, a first sensor and a second sensor configured to recognize states, respectively, of the first electric-power source and the second electric-power source, and states, respectively, of the first driver and second driver, a first output controller and a second output controller coupled with a vehicle control device, and a first processor and a second processor operatively coupled, respectively, with the first and second drivers, the first and second sensors, and the first output and second output controllers. The first processor and the second processor are configured to receive results, respectively, of the recognition from the first sensor and the second sensor, compute charging capacities, respectively, of the first electric-power source and the second electric-power source, and electric power consumed by the electronic steering apparatus, and determine whether electric-power states of the first electric-power source and the second electric-power source are normal, by comparing the electric-power states with each other.

The first processor and the second processor may control the first driver and the second driver, respectively, by controlling an output of the drive motor based on results of the determination of whether or not the electric-power states are normal, compute a speed limit value, and output the speed limit value, and a fail state, through the first output controller and the second output controller, respectively.

The first electric-power source and the second electric-power source may each supply electric power of a low-voltage direct-current converter that converts a high voltage of a battery pack into a low voltage, or charge first and second storage batteries, respectively, with the electric power of the low-voltage direct-current converter.

The drive motor may be one of a reaction motor that provides a haptic feedback of steering when a steering wheel is turned, and a steering motor that steers a vehicle wheel.

In response to a determination that the electric-power states are abnormal, the first processor and the second processor may be configured to stop the reaction motor from operating.

The first sensor module may be configured to recognize one or more of a state of the first electric-power source that indicates a capacity, an output voltage, and temperature, a state of the first driver that indicates an output voltage, output electric current, and temperature that are applied to the drive motor from the first driver in a manner that varies with the number of phases, and a state of the first processor that indicates drive electric current. The second sensor may be configured to recognize one or more of a state of the second electric-power source that indicates a capacity, an output voltage, and temperature, a state of the second driver that indicates an output voltage, output electric current, and temperature that are applied to the drive motor from the second driver in a manner that varies with the number of phases, and a state of the second processor that indicates drive electric current.

The first processor and the second processor may compute a speed limit value in real time according to states of charge of the first electric-power source and the second electric-power source, respectively, and according to the electric power consumed by the electronic steering apparatus.

In another general aspect, a method of controlling an electronic steering apparatus for a vehicle is provided. The method includes receiving, by a first processor and a second processor, results, respectively, of recognition of one or more states from a first sensor and a second sensor, computing, by the first processor and the second processor, charging capacities, respectively, of a first electric-power source and a second electric-power source, and electric power consumed by the electronic steering apparatus, from the results, respectively, of the recognition, determining, by the first processor and the second processor, whether electric-power states of the first electric-power source and the second electric-power source are normal, by comparing the electric-power states with each other, and controlling, by the first processor and the second processor, the first driver and the second driver, respectively, by controlling an output of a drive motor on the basis of results, respectively, of the determination of whether or not the electric-power states are normal.

The method may include outputting, by the first processor and the second processor, a speed limit value and a fail state through the first output controller and the second output controller, respectively, on the basis of the results, respectively, of the determination of whether or not the electric-power states are normal.

Receiving by the first processor and the second processor, of the results, respectively, of the recognition from the first sensor and the second sensor, may include receiving, by the first processor from the first sensor, a capacity, a voltage, and temperature of the first electric-power source, a voltage, electric current, and temperature that are applied to the drive motor from the first driver in a manner that varies with the number of phases, and drive electric current of the first processor, and receiving, by the second processor from the second sensor, a capacity, a voltage, and temperature of the second electric-power source, a voltage, electric current, and temperature that are applied to the drive motor from the second driver in a manner that varies with the number of phases, and drive electric current of the second processor.

Controlling by the first processor and the second processor of the first driver and the second driver, respectively, by controlling the output of the drive motor, in a case where the drive motor is a reaction motor, may include the first processor and the second processor stopping the reaction motor from operating.

Outputting by the first processor and the second processor of the speed limit value and the fail state, may include the first processor and the second processor computing the speed limit value in real time according to states of charge of the first electric-power source and the second electric-power source, respectively, and according to the electric power consumed by the electronic steering apparatus.

In another general aspect, an electronic steering apparatus for a vehicle is provided. The apparatus includes a first driver and a second driver configured to drive a drive motor by being supplied, respectively, with electric power from a first electric-power source and a second electric-power source, a first sensor and a second sensor configured to recognize states, respectively, of the first electric-power source and the second electric-power source, and states, respectively, of the first driver and second driver, a first output controller and a second output controller coupled to a vehicle control device, and a first processor and a second processor operatively coupled, respectively, to the first and second drivers, the first and second sensors, and the first output and second output controllers. The first processor is configured to receive results of the recognition from the first sensor, compute charging capacities of the first electric-power source, and electric power consumed by the electronic steering apparatus, The second processor is configured to receive results of the recognition from the second sensor, compute charging capacities of the second electric-power source, and electric power consumed by the electronic steering apparatus, and the first processor and the second processor are configured to determine whether electric-power states of the first electric-power source and the second electric-power source are normal, by comparing the electric-power states with each other.

Throughout the drawings and the detailed description, unless otherwise described or provided, the same drawing reference numerals will be understood to refer to the same elements, features, and structures. The drawings may not be to scale, and the relative size, proportions, and depiction of elements in the drawings may be exaggerated for clarity, illustration, and convenience.

DETAILED DESCRIPTION

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order.

The features described herein may be embodied in different forms and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Advantages and features of the present disclosure and methods of achieving the advantages and features will be clear with reference to embodiments described in detail below together with the accompanying drawings. However, the present disclosure is not limited to the embodiments disclosed herein but will be implemented in various forms. The embodiments of the present disclosure are provided so that the present disclosure is adequately disclosed, and a person with ordinary skill in the art can fully understand the scope of the present disclosure. Meanwhile, the terms used in the present specification are for explaining the embodiments, not for limiting the present disclosure.

Terms, such as first, second, A, B, (a), (b) or the like, may be used herein to describe components. Each of these terminologies is not used to define an essence, order or sequence of a corresponding component but used merely to distinguish the corresponding component from other component(s). For example, a first component may be referred to as a second component, and similarly the second component may also be referred to as the first component.

Throughout the specification, when a component is described as being "connected to," or "coupled to" another component, it may be directly "connected to," or "coupled to" the other component, or there may be one or more other components intervening therebetween. In contrast, when an element is described as being "directly connected to," or "directly coupled to" another element, there can be no other elements intervening therebetween.

The singular forms "a", "an", and "the" are intended to include the plural forms as well, unless the context clearly indicates otherwise. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

An electronic steering apparatus for a vehicle and a method of controlling the electronic steering apparatus for a vehicle according to the present disclosure will be described with reference to the accompanying drawings.

Figure 1:
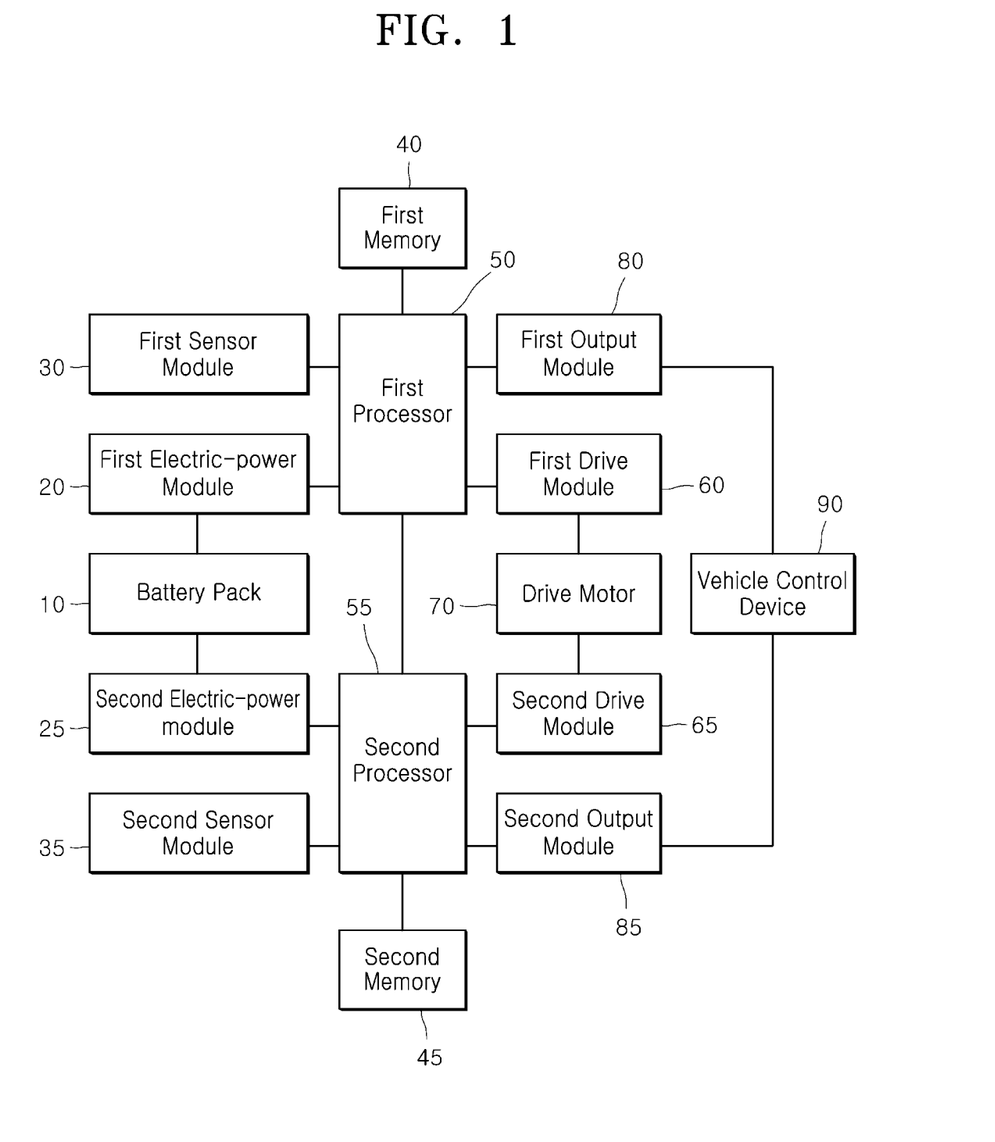
FIG. 1 is a block diagram illustrating an electronic steering apparatus for a vehicle according to a first embodiment of the present disclosure.
Figure 2:
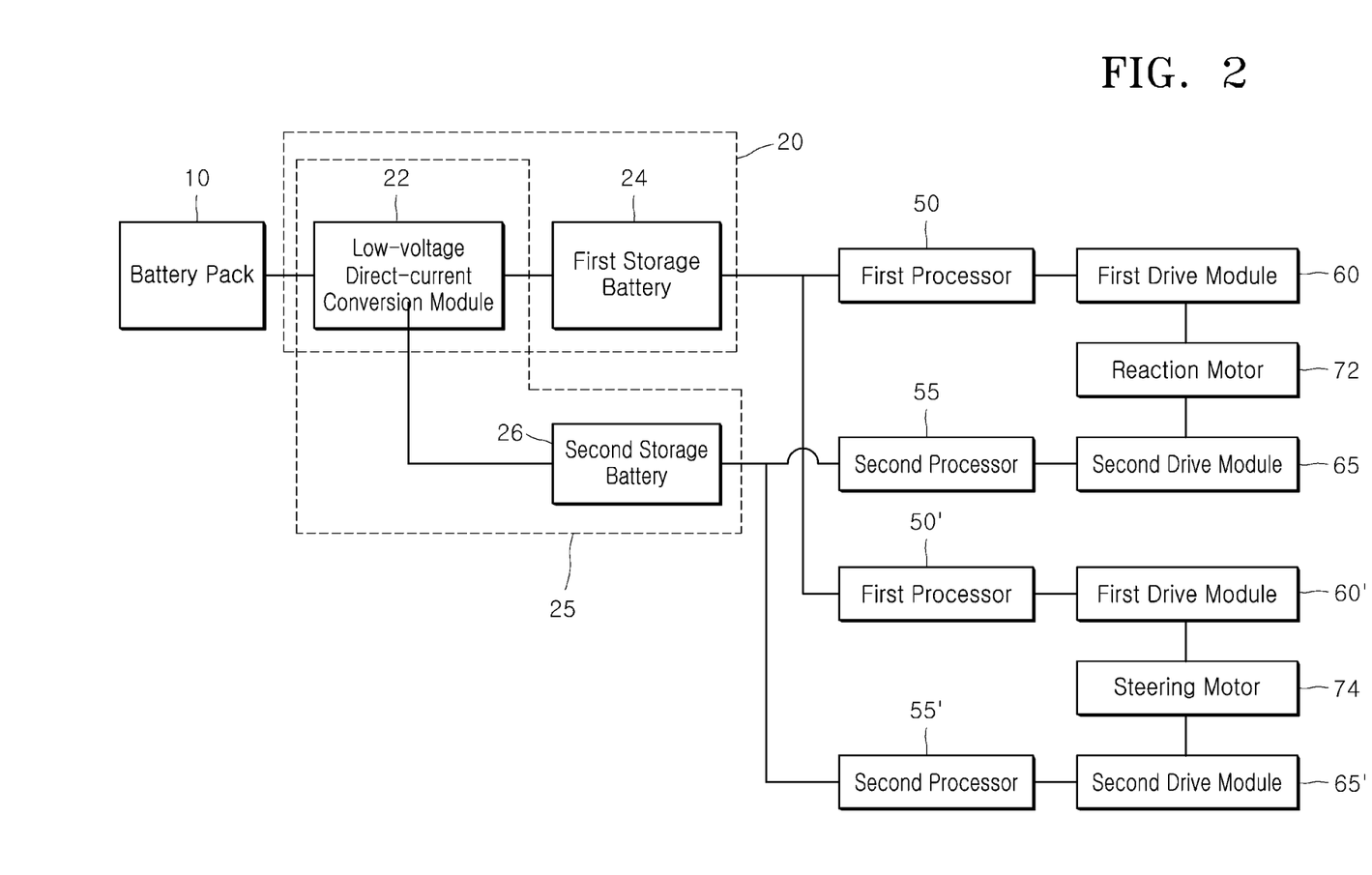
FIG. 2 is a block diagram illustrating a state where an electric-power module is coupled in the electronic steering apparatus for a vehicle according to the first embodiment of the present disclosure.
Figure 3:
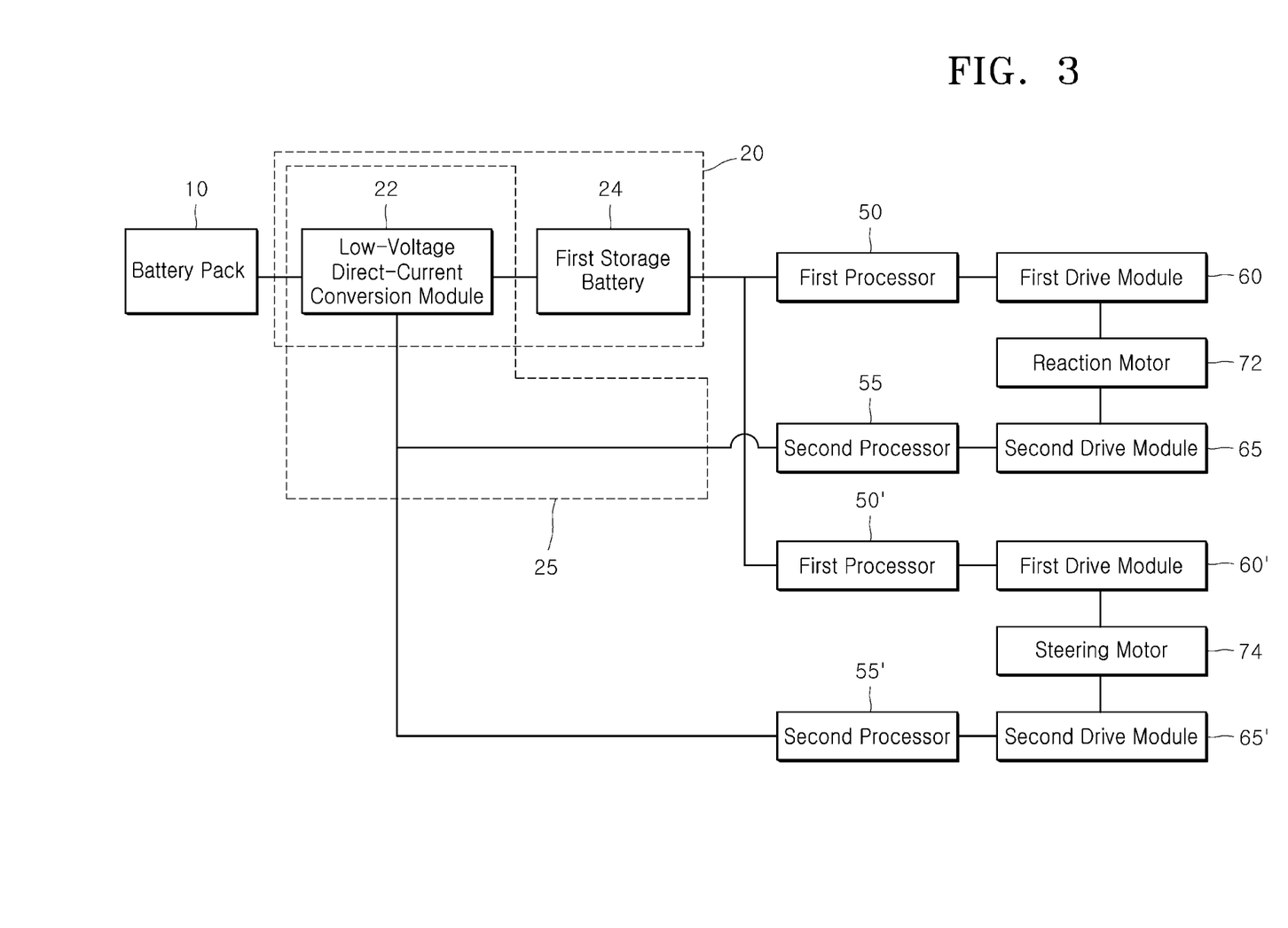
FIG. 3 is a block diagram illustrating a state where an electric-power module is coupled in an electronic steering apparatus for a vehicle according to a second embodiment of the present disclosure.

FIG. 1 is a block diagram illustrating an electronic steering apparatus for a vehicle according to a first embodiment of the present disclosure. FIG. 2 is a block diagram illustrating a state where an electric-power module is coupled in the electronic steering apparatus for a vehicle according to the first embodiment of the present disclosure. FIG. 3 is a block diagram illustrating a state where an electric-power module is coupled in an electronic steering apparatus for a vehicle according to a second embodiment of the present disclosure.

As illustrated in FIG. 1, the electronic steering apparatus for a vehicle according to the first embodiment of the present disclosure may include a first electric-power module 20 (for example, a first electric-power source), a second electric-power module 25 (for example, a second electric-power source), a first drive module 60 (a first driver), a second drive module 65 (for example a second driver), a first sensor module 30 (for example, a first sensor), a second sensor module 35 (for example, a second sensor), a first output module 80 (for example, a first output controller), a second output module 85 (for example, a second output controller), a first memory 40, a second memory 45, a first processor 50, and a second processor 55.

The first electric-power module 20 and the second electric-power module 25, as illustrated in FIG. 2, may charge a first storage battery 24 and a second storage battery 26, respectively, with electric power of a low-voltage direct-current conversion module 22 that converts a high voltage of a battery pack 10 into a low voltage, and thus may separately supply electric power to each of the first processor 50 and the second processor 55.

In addition, as illustrated in FIG. 3, the first electric-power module 20 may charge the first storage battery 24 with the electric power of the low-voltage direct-current conversion module 22 that converts a high voltage of the battery pack 10 into a low voltage, and thus may supply electric power to the first processor 50. Moreover, the second electric-power module 25 may supply the electric power of the low-voltage direct-current conversion module 22 to the second processor 55.

At this point, it is preferred that any one of the first electric-power module 20 and the second electric-power module 25 supplies electric power through the first storage battery 24 or the second storage battery 26. In a case where a failure occurs in a common part of an electric-power system through which electric power is supplied from the battery pack 10 to the low-voltage direct-current conversion module 22, electric power for fail driving can be secured.

The first drive module 60 and the second drive module 65 may be supplied with electric power from the first electric-power module 20 and the second electric-power module 25, respectively, and thus may drive a drive motor 70.

The drive motor 70 here may be configured as a dual winding motor that is driven by each of the first drive module 60 and the second drive module 65.

In addition, the drive motor 70, as illustrated in FIGS. 2 and 3, may include a reaction motor 72 that provides a feeling (for example, via haptic feedback) of steering when a steering wheel is turned, and a steering motor 74 that steers a vehicle wheel.

The first sensor module 30 may recognize a state of the first electric-power module 20 and a state of the first drive module 60. The second sensor module 35 may recognize a state of the second electric-power module 25 and a state of the second drive module 65.

The first sensor module 30 may recognize one or more of a state of the first electric-power module 20 that indicates a capacity, an output voltage, and temperature, a state of the first drive module 60 that indicate an output voltage, output electric current, and temperature which are applied to the drive motor 70 from the first drive module 60 in a manner that varies with the number of phases, and a state of the first processor 50 that indicates drive electric current. The second sensor module 35 may recognize one or more of a state of the second electric-power module 25 that indicates a capacity, an output voltage, and temperature, a state of the second drive module 65 that indicates an output voltage, output electric current, and temperature which are applied to the drive motor 70 from the second drive module 65 in a manner that varies with the number of phases, and a state of the second processor 55 that indicates drive electric current.

The first output module 80 and the second output module 85 may be coupled to a vehicle control device 90 and may transfer a speed limit value and a fail state. Thus, according to the speed limit value, a vehicle may perform speed reduction control and may turn on a warning light and output a warning message according to the fail state.

Data associated with an application program for operating the electronic steering apparatus may be stored in each of the first memory 40 and the second memory 45. Information to be stored may be independently selected, according to need, by the first processor 50 and the second processor 55.

Various types of data that occur while running an operating system or executing an application (a program or an applet) in order to operate the electronic steering apparatus are stored in the first memory 40 and the second memory 45. At this point, the first memory 40 and the second memory 45 collectively refer to non-volatile storage devices that can keep information stored without being supplied with electric power and volatile storage devices that need electric power to keep information stored. In addition, the first memory 40 and the second memory 45 may perform a function of temporarily or permanently storing data that are processed by the first processor 50 and the second processor 55.

Examples of the first memory 40 and the second memory 45 here may include a magnetic storage medium and a flash storage medium, as well as a volatile storage device that needs electric power to keep information stored, but the scope of the present disclosure is not limited thereto.

The first processor 50 may be operatively coupled to the first drive module 60, the first sensor module 30, the first output module 80, and the first memory 40, and the second processor 55 may be operatively coupled to the second drive module 65, the second sensor module 35, the second output module 85, and the second memory 45. The first processor 50 and the second processor 55 may be realized as an integrated circuit or a system configured to control the overall operation of the electronic steering apparatus.

The first processor 50 and the second processor 55 may execute application programs that are stored in the first memory 40 and the second memory 45, respectively, and may receive the results, respectively, of the recognition from the first sensor module 30 and the second sensor module 35. Then, the first processor 50 and the second processor 55 may compute the charging capacities, respectively, of the first electric-power module 20 and the second electric-power module 25, and electric power consumed by the electronic steering apparatus. Then, the first processor 50 and the second processor 55 may determine whether electric-power states are normal, by comparing the electric-power states with each other, and then may perform the fail driving.

At this point, in a case where the first processor 50 and the second processor 55 compare the electric-power states with each other and where a difference between output voltages of the first electric-power module 20 and the second electric-power module 25 falls outside a preset range, the first processor 50 and the second processor 55 may determine that the electric-power states are abnormal.

At this point, when, as illustrated in FIG. 3, supplied with electric power from the low-voltage direct-current conversion module 22 through the second electric-power module 25, the first processor 50 and the second processor 55 may not compute a charging capacity of the second electric-power module 25. However, by comparing the output voltage of the second electric-power module 25 and the output voltage of the first electric-power module 20, the first processor 50 and the second processor 55 may determine whether the output voltages are equal to or lower than a preset voltage, or whether the difference therebetween is equal to or greater than a preset voltage. Thus, the first processor 50 and the second processor 55 may determine whether or not the electric-power states are normal.

In addition, when, as illustrated in FIG. 2, supplied with electric power from the first electric-power module 20 and the second electric-power module 25 through the first storage battery 24 and the second storage battery 26, respectively, the first processor 50 and the second processor 55 may compute a charging capacity of the first electric-power module 20 and the charging capacity of the second electric-power module 25, respectively. Then, by comparison, the first processor 50 and the second processor 55 may determine whether or the output voltages of the first electric-power module 20 and the second electric-power module 25, respectively, are equal to or lower than a preset voltage. As a result, the first processor 50 and the second processor 55 may determine whether or not the electric-power states are normal.

The electric power consumed by the electronic steering apparatus may be computed on the basis of the driving current for the first processor 50 and the second processor 55 themselves and on the basis of the voltage and the electric current that are applied to the drive motor 70 through the first drive module 60 and the second drive module 65 in a manner that varies with the number of phases.

In this manner, when determining whether or not the electric-power states are normal and then determining that the electric-power states are abnormal, for the fail driving, the first processor 50 and the second processor 55 may control the first drive module 60 and the second drive module 65, respectively, by limiting an output of the drive motor 70.

That is, in order to reduce the consumption of the electric power, the first processor 50 and the second processor 55 may decrease an operating speed of the drive motor 70 by limiting electric current that is applied to the drive motor 70 and may also stop the reaction motor 72 from operating.

In addition, the first processor 50 and the second processor 55 may compute a speed limit value of the vehicle in real time on the basis of the charging capacity of the first electric-power module 20 and the charging capacity of the second electric-power module 25, respectively, and on the basis of the consumed electric power and thus may output the computed speed limit value to the vehicle control device 90 through the first output module 80 and the second output module 85, respectively. Accordingly, the vehicle may come to a stop in a state where the electronic steering apparatus is unable to operate.

As illustrated in FIG. 3, the second processor 55 that is to be directly supplied with electric power from the low-voltage direct-current conversion module 22 through the second electric-power module 25 may not be supplied with electric power due to a failure in the common part of the electric-power system. For this reason, the fail driving may be performed through the first processor 50.

In addition, the first processor 50 and the second processor 55 may output the fail state through the first output module 80 and the second output module 85, respectively, and the vehicle control device 90 may turn on a warning light and may output a warning message. Thus, a driver may recognize a failure state of the electronic steering apparatus and may stop the vehicle.

As described above, in an electric vehicle equipped with a steer-by-wire (SBW) system, when driven by being supplied with separated electric power from one battery pack, the electronic steering apparatus for a vehicle according to the first or second embodiment of the present disclosure, the electronic steering apparatus for a vehicle according to the first or second embodiment of the present disclosure may perform the fail driving by diagnosing a failure in the common part of the electric-power system. Thus, the cost that is incurred due to redundant power supplies can be saved. Moreover, the stability of the electronic steering apparatus can be maintained without completely separating electric power.

Figure 4:
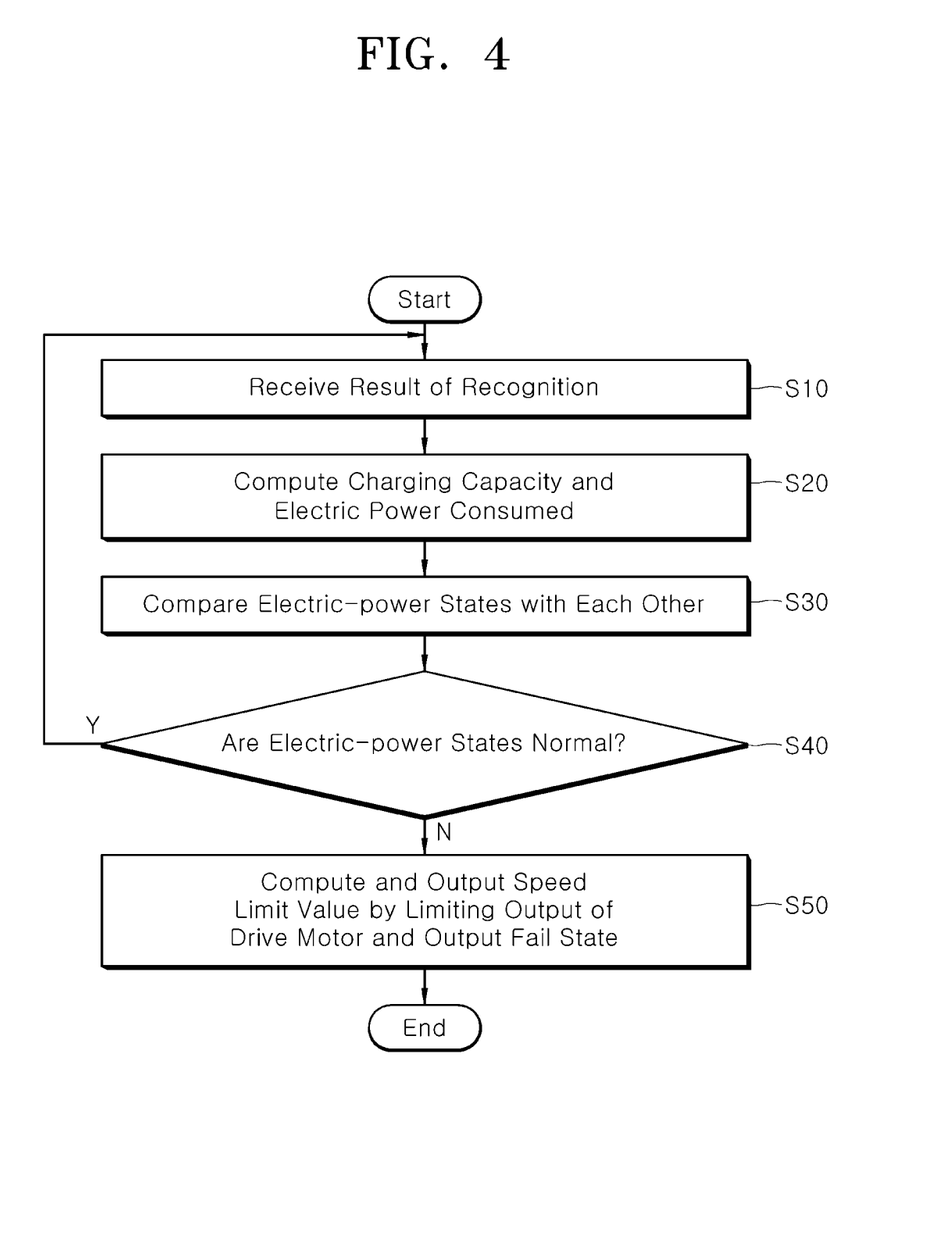
FIG. 4 is a flowchart that is referred to for description of a method of controlling the electronic steering apparatus for a vehicle according to a third embodiment of the present disclosure.

FIG. 4 is a flowchart that is referred to for description of a method of controlling the electronic steering apparatus for a vehicle according to a third embodiment of the present disclosure.

As illustrated in FIG. 4, in the method of controlling the electronic steering apparatus for a vehicle according to the third embodiment of the present disclosure, the first processor 50 and the second processor 55 receive the results, respectively, of the recognition from the first sensor module 30 and the second sensor module 35 (S10).

The first processor 50 may receive from the first sensor module 30 the result of the recognition of one or more of the state of the first electric-power module 20 that indicates a capacity, an output voltage, and temperature, the state of the first drive module 60 that indicates an output voltage, output electric current, and temperature which are applied to the drive motor 70 from the first drive module 60 in a manner that varies with the number of phases, and the state of the first processor 50 that indicates drive electric current. The second processor 55 may receive from the second sensor module 35 the result of the recognition of one or more of the state of the second electric-power module 25 that indicates a capacity, an output voltage, and temperature, the state of the second drive module 65 that indicates an output voltage, output electric current, and temperature which are applied to the drive motor 70 from the second drive module 65 in a manner that varies with the number of phases, and the state of the second processor 50 that indicates drive electric current.

In Step S10, the first processor 50 and the second processor 55 receive the results, respectively, of the recognition from the first sensor module 30 and the second sensor module 35. Then, the first processor 50 computes from the result of the recognition the charging capacity of the first electric-power module 20 and the electric power consumed by the electronic steering apparatus, and the second processor 55 computes from the result of the recognition the charging capacity of the second electric-power module 25 and the electric power consumed by the electronic steering apparatus (S20).

The first electric-power module 20 and the second electric-power module 25, as illustrated in FIG. 2, may charge the first storage battery 24 and the second storage battery 26, respectively, with the electric power of the low-voltage direct-current conversion module 22 that converts a high voltage of the battery pack 10 into a low voltage. Thus, the respective electric power of the first storage battery 24 and the second storage battery 26 may be separately supplied to the first processor 50 and the second processor 55, respectively.

In addition, as illustrated in FIG. 3, the first electric-power module 20 may charge the first storage battery 24 with the electric power of the low-voltage direct-current conversion module 22 that converts a high voltage of the battery pack 10 into a low voltage, and thus may supply electric power to the first processor 50. Moreover, the second electric-power module 25 may supply the electric power of the low-voltage direct-current conversion module 22 to the second processor 55.

At this point, it is preferred that any one of the first electric-power module 20 and the second electric-power module 25 supplies electric power through the first storage battery 24 or the second storage battery 26. In the case where a failure occurs in the common part of the electric power system through which electric power is supplied from the battery pack 10 to the low-voltage direct-current conversion module 22, the electric power for the fail driving can be secured.

In this manner, the first processor 50 and the second processor 55 may selectively compute the charging capacities according to which mode of electric-power supply is used by the first electric-power module 20 and the second electric-power module 25.

That is, in a case where, as illustrated in FIG. 3, the second processor 55 is supplied with electric power from the low-voltage direct-current conversion module 22 through the second electric-power module 25, the second processor 55 may not compute the charging capacity of the second electric-power module 25. However, in a case where, as illustrated in FIG. 2, the first electric-power module 20 and the second electric-power module 25 supply electric power through the first storage battery 24 and the second storage battery 26, respectively, the second processor 55 may compute the charging capacity of the second electric-power module 25.

The electric power consumed by the electronic steering apparatus may be computed on the basis of the driving current for the first processor 50 and the second processor 55 themselves and on the basis of the voltage and the electric current that are applied to the drive motor 70 through the first drive module 60 and the second drive module 65 in a manner that varies with the number of phases.

Subsequently, the first processor 50 and the second processor 55 compare the electric-power states with each other (S30).

At this point, by comparing the output voltage of the first electric-power module 20 and the output voltage of the second electric-power module 25, the first processor 50 and the second processor 55 may determine whether the output voltages are equal to or lower than the preset voltage, or whether the difference therebetween is equal to or greater than the preset voltage.

The electric-power states may be compared with each other in Step S30. The first processor 50 and the second processor 55 determine whether or not the electric-power states are normal (S40).

In Step S40, the first processor 50 and the second processor 55 determine whether the electric-power states are normal. In a case where the electric-power states are normal, the above-mentioned steps are repeatedly performed, and in a case where the electric-power states are abnormal, the fail driving is performed (S50).

First, for the fail driving, the first processor 50 and the second processor 55 may control the first drive module 60 and the second drive module 65, respectively, by limiting the output of the drive motor 70.

That is, in order to reduce the consumption of the electric power, the first processor 50 and the second processor 55 may decrease the operating speed of the drive motor 70 by limiting electric current that is applied to the drive motor 70 and may also stop the reaction motor 72 from operating.

In addition, the first processor 50 and the second processor 55 may compute the speed limit value of the vehicle in real time on the basis of the charging capacity of the first electric-power module 20 and the charging capacity of the second electric-power module 25, respectively, and on the basis of the consumed electric power and thus may output the computed speed limit value to the vehicle control device 90 through the first output module 80 and the second output module 85, respectively. Accordingly, the vehicle may come to a stop in the state where the electronic steering apparatus is unable to operate.

As illustrated in FIG. 3, the second processor 55 that is to be directly supplied with electric power from the low-voltage direct-current conversion module 22 through the second electric-power module 25 may not be supplied with electric power due to the failure in the common part of the electric-power system. For this reason, the fail driving may be performed through the first processor 50.

In addition, the first processor 50 and the second processor 55 may output the fail state through the first output module 80 and the second output module 85, respectively, and the vehicle control device 90 may turn on the warning light and may output the warning message. Thus, the driver may recognize the failure state of the electronic steering apparatus and may stop the vehicle.

As described above, with the method of controlling the electronic steering apparatus for a vehicle according to the third embodiment of the present disclosure, in the electric vehicle equipped with the steer-by-wire (SBW) system, when driven by being supplied with separated electric power from one battery pack, the electronic steering apparatus for a vehicle, may perform the fail driving by diagnosing a failure in the common part of the electric-power system. Thus, the cost that is incurred due to redundant power supplies can be saved. Moreover, the stability of the electronic steering apparatus can be maintained without completely separating electric power.

A number of embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

The embodiments disclosed herein provide an electronic steering apparatus for a vehicle, the apparatus being capable of performing fail driving by diagnosing a failure in a common part, when driven by being supplied with separated electric power from one battery pack in an electric vehicle equipped with a steer-by-wire (SBW) system, and a method of controlling the electronic steering apparatus for a vehicle.

The electronic steering apparatus for a vehicle according to the aspect of the present disclosure and the method of controlling the electronic steering apparatus according to the aspects, respectively, of the present disclosure are capable of performing fail driving by diagnosing a failure in a common part, when driven by being supplied with separated electric power from one battery pack in an electric vehicle equipped with a steer-by-wire (SBW) system. Thus, the cost that is incurred due to redundant power supplies can be saved. Moreover, the stability of the electronic steering apparatus can be maintained without completely separating electric power.

The embodiments disclosed herein provide separation of electric power and the redundant design on a per-vehicle basis at a significantly reduced cost, and thus increases competitiveness through mass production. The embodiments disclosed herein provide a structure, a function and safety method that reduces the cost of the SBW system.

While this disclosure includes specific examples, it will be apparent after an understanding of the disclosure of this application that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An electronic steering apparatus for a vehicle, the electronic steering apparatus comprising:
    a first driver and a second driver configured to drive a drive motor by being supplied, respectively, with electric power from a first electric-power source and a second electric-power source;
    a first sensor and a second sensor configured to recognize states, respectively, of the first electric-power source and the second electric-power source, and states, respectively, of the first driver and second driver;
    a first output controller and a second output controller coupled with a vehicle control device; and
    a first processor and a second processor operatively coupled, respectively, with the first driver and the second driver, the first sensor and the second sensor, and the first output controller and the second output controller,
    wherein the first processor and the second processor are configured to:
        receive results, respectively, of the recognition from the first sensor and the second sensor,
        individually compute, based on measured sensor input valves, charging capacities, respectively, of the first electric-power source and the second electric-power source, and electric power consumed by the electronic steering apparatus, and
        determine whether electric-power states of the first electric-power source and the second electric-power source are normal, by comparing the electric-power states with each other,
    wherein the computation estimating stored energy based on dynamic sensing of charge and discharge behavior over time, not based on static design parameters.

2. The electronic steering apparatus of claim 1, wherein the first processor and the second processor control the first driver and the second driver, respectively, by controlling an output of the drive motor based on results of the determination of whether or not the electric-power states are normal, compute a speed limit value, and output the speed limit value, and a fail state, through the first output controller and the second output controller, respectively.

3. The electronic steering apparatus of claim 1, wherein the first electric-power source and the second electric-power source each supply electric power of a low-voltage direct-current converter that converts a high voltage of a battery pack into a low voltage, or charge first and second storage batteries, respectively, with the electric power of the low-voltage direct-current converter.

4. The electronic steering apparatus of claim 1, wherein the drive motor is any one of a reaction motor that provides a haptic feedback of steering when a steering wheel is turned, and a steering motor that steers a vehicle wheel.

5. The electronic steering apparatus of claim 4, wherein, in response to a determination that the electric-power states are abnormal, the first processor and the second processor are configured to stop the reaction motor from operating.

6. The electronic steering apparatus of claim 1, wherein the first sensor is configured to recognize one or more of a state of the first electric-power source that indicates a capacity, an output voltage, and temperature, a state of the first driver that indicates an output voltage, output electric current, and temperature that are applied to the drive motor from the first driver in a manner that varies with a phase of the drive motor, and a state of the first processor that indicates drive electric current, and
wherein the second sensor is configured to recognize one or more of a state of the second electric-power source that indicates a capacity, an output voltage, and temperature, a state of the second driver that indicates an output voltage, output electric current, or temperature that are applied to the drive motor from the second driver in a manner that varies with the phase of the drive motor, and a state of the second processor that indicates drive electric current.

7. The electronic steering apparatus of claim 1, wherein the first processor and the second processor compute a speed limit value in real time according to states of charge of the first electric-power source and the second electric-power source, respectively, and according to the electric power consumed by the electronic steering apparatus.

8. A method of controlling an electronic steering apparatus for a vehicle, the method comprising:
receiving, by a first processor and a second processor, results, respectively, of recognition of one or more states from a first sensor and a second sensor;
computing, by the first processor and the second processor, respective real-time estimates of charging capacities, respectively, of a first electric-power source and a second electric-power source, and electric power consumed by the electronic steering apparatus, from the results, respectively, of the recognition;
determining, by the first processor and the second processor, whether electric-power states of the first electric-power source and the second electric-power source are normal, by comparing the electric-power states with each other; and
controlling, by the first processor and the second processor, the first driver and the second driver, respectively, by controlling an output of a drive motor on the basis of results, respectively, of the determination of whether or not the electric-power states are normal,
wherein the computing comprises deriving power availability from dynamic system parameters, rather than relying on fixed hardware specifications.

9. The method of claim 8, further comprising:
outputting, by the first processor and the second processor, a speed limit value and a fail state through the first output controller and the second output controller, respectively, on the basis of the results, respectively, of the determination of whether or not the electric-power states are normal.

10. The method of claim 9, wherein receiving by the first processor and the second processor, of the results, respectively, of the recognition from the first sensor and the second sensor, comprises receiving, by the first processor from the first sensor, a capacity, a voltage, and temperature of the first electric-power source, a voltage, electric current, and temperature that are applied to the drive motor from the first driver in a manner that varies with a phase of the drive motor, and drive electric current of the first processor, and receiving, by the second processor from the second sensor, a capacity, a voltage, and temperature of the second electric-power source, a voltage, electric current, and temperature that are applied to the drive motor from the second driver in a manner that varies with the phase of the drive motor, and drive electric current of the second processor.

11. The method of claim 9, wherein controlling by the first processor and the second processor of the first driver and the second driver, respectively, by controlling the output of the drive motor, in a case where the drive motor is a reaction motor, comprises the first processor and the second processor stopping the reaction motor from operating.

12. The method of claim 9, wherein outputting by the first processor and the second processor of the speed limit value and the fail state, comprises the first processor and the second processor computing the speed limit value in real time according to states of charge of the first electric-power source and the second electric-power source, respectively, and according to the electric power consumed by the electronic steering apparatus.

13. An electronic steering apparatus for a vehicle, the electronic steering apparatus comprising:
a first driver and a second driver configured to drive a drive motor by being supplied, respectively, with electric power from a first electric-power source and a second electric-power source;
a first sensor and a second sensor configured to recognize states, respectively, of the first electric-power source and the second electric-power source, and states, respectively, of the first driver and second driver;
a first output controller and a second output controller coupled with a vehicle control device; and
a first processor and a second processor operatively coupled, respectively, with the first driver and the second driver, the first sensor and the second sensor, and the first output controller and the second output controller,
wherein the first processor is configured to:
receive results of the recognition from the first sensor,
compute, based on real-time current and voltage measurements, charging capacities of the first electric-power source, and electric power consumed by the electronic steering apparatus,
wherein the second processor is configured to:
receive results of the recognition from the second sensor,
compute, based on measured charge behavior over time, charging capacities of the second electric-power source, and electric power consumed by the electronic steering apparatus,
and one or more of the first processor and the second processor are configured to:
determine whether electric-power states of the first electric-power source and the second electric-power source are normal, by comparing the electric-power states with each other, wherein the comparison is based on adaptive thresholds derived from recent operating history.

* * * * *